Patented Jan. 4, 1949

2,458,107

UNITED STATES PATENT OFFICE 2,458,107

PROCESS FOR THE PREPARATION OF CARBON

Joseph H. Simons, State College, Pa., assignor to Phillips Petroleum Company, a corporation of Delaware No Drawing. Application December 23, 1941, Serial No. 424,214

15 Claims. (Cl. 23—209.1)

This invention relates to the preparation of carbon by the oxidation of non-aromatic substances in the presence of liquid hydrogen fluoride as a catalyst. The non-aromatic substances may be alicyclic, or aliphatic.

One of the common ways of preparing carbon is by burning organic substances in a flame. The present process has for its object the preparation of carbon at much lower temperatures and has the advantage that carbons of different density may be produced by varying the temperature at which the process is conducted. As the temperature of the process is raised, the density of the carbon produced is increased.

In the process of the present invention, low temperatures are employed, i. e., not substantially in excess of 200° C. Oxygen and oxygen-containing gases such as air, as well as other oxidizing agents, may be employed. Carbon of high quality is produced in good yield without substantial contamination by other products.

In carrying out the process, the non-aromatic compound constituting the charging stock may be placed in a suitable reaction chamber with hydrogen fluoride and preferably with an oxygen carrier. To the reaction chamber there are attached a reflux condenser and apparatus equipped with appropriate valves and gauges. The reaction chamber is located in a suitable heater and mounted on a shaking machine or other device for effecting efficient agitation. When a solid or liquid oxidizing agent is employed, it may be added before the reflux condenser is attached. When a gaseous oxidizing agent is employed, such as air, molecular oxygen, or other oxygen-containing gases, such agent may be admitted to the reaction chamber which is then heated to the desired temperature. It is desirable to effect agitation of the reaction mixture during the process. After the reaction is completed, the excess gases may be exhausted from the apparatus at a point above the reflux condenser. The hydrogen fluoride employed in the process may be reclaimed by distillation. The carbon product is recovered from the reaction mixture by filtration and washing.

As a further feature of the process, it has been found desirable but not essential to employ a so-called "oxygen carrier." A great variety of substances have been found suitable for use as oxygen carriers. These include finely divided silver, silver oxide, silver fluoride, etc.; the oxides of arsenic, selenium, iron, molybdenum, vanadium, uranium, tungsten, manganese, chromium, copper, etc.; sulfuric acid, selenic acid, arsenic acid, etc. Although the oxygen carrier is frequently added as the oxide, it will be appreciated that the fluorides or oxyfluorides are present in most cases due to the action of the hydrogen fluoride. Because of the oxidizing action of the oxygen or other oxidizing agent present and also due to the reducing action of the organic substance, the valence of the oxygen carrier is afforded opportunity to change during the process.

It thus makes little difference in what chemical form the oxygen carrier is used. For example, the silver may be added either as the metal, the oxide, the fluoride, or the bromide, etc., while the arsenic may be added either as arsenious acid, arsenic acid, the salts of either of these acids, arsenious oxide, arsenic oxide, arsenic trichloride, arsenic pentachloride, arsenic trifluoride, arsenic pentafluoride, or as any of the oxy-chlorides, bromides, fluorides, etc.

While the addition of an oxygen carrier is beneficial in the practice of the process, it is to be understood that it is not essential since the process can be carried out, although not as efficiently, in the absence of an added oxygen carrier. Because of the wide range of substances which can be used as oxygen carriers, it is believed that these substances act as a means of transporting the oxidation properties of the oxygen source material to the molecules of the organic compound that is being oxidized to form carbon. It is also believed that any element that can undergo a valence change under the conditions prevailing in the process can serve in this capacity. For example, silver may dissolve the oxygen and carry it in the dissolved condition to the organic compound, or it may form silver oxide or fluoride with the attendant valence change and thus carry the oxidizing property. The arsenic compounds, for example, can undergo the valence change from the three to the five valent forms and vice versa and thus serve as oxygen carriers.

In some cases mixtures of oxygen carriers may also be employed. When the process is practiced without the addition of an oxygen carrier, the reaction is slower. Although all of the oxygen carriers act generally in a similar manner, there are minor differences. For example, arsenic, selenium, and silver compounds cause the process to operate at lower temperatures while water and methanol cause the reaction to take place at higher temperatures and thus ensure production of a more dense carbon. Sulfuric acid has the effect of causing the process to take place at lower temperatures and to thus produce a less dense and softer carbon.

It is believed that the action proceeds as follows: Hydrogen fluoride activates the hydrogen atoms on the organic compound. The strong dehydrating effect and also the strong acidity of the hydrogen fluoride tend to favor the oxidation. This oxidation in the presence of hydrogen fluoride is unusual in that the oxides of carbon are not formed in appreciable amounts. It is thus apparent that the process is one of oxidative dehydrogenation, producing carbonaceous residues.

When a gaseous oxidizing agent such as air or molecular oxygen is used, the pressure may be varied over wide limits. While the process is operative at atmospheric pressure, it takes place more rapidly at pressures from 500 to 1000 pounds per square inch, and it is accordingly preferable to operate in that range. The process can be operated at 50°, but it proceeds more rapidly as the temperature is raised. Temperatures within the range of from 80° C. to 200° C. are practical temperatures. However, it is preferred in most instances to operate at temperatures from 120° C. to 160° C.

The molecular ratio of hydrocarbon to hydrogen fluoride of 3:1 can be used, but carbon is prepared at lower temperatures with mixtures containing more hydrogen fluoride than this ratio. In fact ratios of hydrocarbons to hydrogen fluorides of 1:6 or higher are very satisfactory. Usually where a ratio of hydrocarbon to hydrogen fluoride containing more hydrocarbon than 3:1 is employed, there is some carbon dioxide formed in the products.

Many kinds of organic compounds may be used in the process for the production of carbon. These may include aliphatic, alicyclic, olefinic, and other hydrocarbons. The oxygen-containing compounds of the same series, such as alcohols, carboxylic acids, etc., are also useful. In fact the process may be operated employing any desired organic substance. Paraffin hydrocarbons, petroleums, woods, and other natural organic substances may be employed.

The following examples are illustrative of the process. In the examples the parts referred to are parts by weight, temperatures are given in degree centigrade, and the pressure is given in pounds per square inch.

Example 1

To 17 parts of cyclohexane were added 60 parts of hydrogen fluoride and 30 parts of arsenic oxide. Oxygen was added at 600 pounds pressure, and a temperature of 120° C. was maintained for five hours with agitation. No carbon dioxide, carbon monoxide, or inflammable gases were obtained. 0.2 of a part of carbon were produced.

Example 2

To 49 parts of methyl cyclohexane were added 65 parts of hydrogen fluoride and 30 parts of arsenious oxide. The oxygen was admitted at 550 pounds per square inch pressure, and a temperature of 120° C. was maintained for six hours with agitation. The non-gaseous product obtained was carbon, of which there were 2.6 parts. The rest of the methyl cyclohexane was recovered.

Example 3

To 14.5 parts of heptane were added 60 parts of hydrogen fluoride and 30 parts of arsenic oxide. Oxygen at 550 pounds gauge pressure was admitted, and a temperature of 130° C. was maintained for five hours. The non-gaseous product obtained other than the recovered original hydrocarbon was 0.2 of a part of carbon.

Example 4

To 75 parts of propyl alcohol were added 220 parts of hydrogen fluoride and 30 parts of silver oxide. Oxygen at 850 pounds per square inch pressure was added, and a temperature of 90° C. was maintained for three hours with agitation. 27 parts of carbon were produced.

The foregoing description is given by way of exemplification of the invention and is not to be constructed in limitation thereof, the invention being limited only by the scope of the subjoined claims.

Having thus described my invention, I claim:

1. A process for oxidizing a non-aromatic compound selected from the group consisting of non-aromatic hydrocarbons and alcohols which comprises oxidizing the same in the presence of an oxidizing agent under super-atmospheric pressure at a temperature within the range of 50 to 200° C. in a reaction mixture containing liquid hydrogen fluoride in substantial amounts as an essential constituent, and recovering carbon as a product of the reaction.

2. A process for oxidizing non-aromatic hydrocarbons which comprises oxidizing the hydrocarbon in the presence of an oxidizing agent under superatmospheric pressure at a temperature within the range of 50 to 200° C. in a reaction mixture containing liquid hydrogen fluoride in substantial amounts as an essential constituent, and recovering carbon as a product of the reaction.

3. A process according to claim 2 in which the pressure is within the range of 500 to 1,000 pounds per square inch.

4. A process according to claim 2 in which the oxidation is effected with an oxygen-containing gas.

5. A process of oxidizing propyl alcohol to form carbon which comprises oxidizing the same with gaseous oxygen under super-atmospheric pressure at a temperature within the range of 50 to 200° C. in a reaction mixture containing liquid hydrogen fluoride as a major constituent and further containing silver oxide as an oxygen carrier, and recovering the carbon so produced.

6. A process for oxidizing non-aromatic hydrocarbons to form carbon which comprises oxidizing the hydrocarbon in the presence of an oxidizing agent under super-atmospheric pressure at a temperature within the range of 50 to 200° C. in a reaction mixture containing liquid hydrogen fluoride, the molecular ratio of hydrocarbon to hydrogen fluoride not exceeding 3:1, and recovering the carbon so produced.

7. A process for oxidizing non-aromatic hydrocarbons which comprises oxidizing the hydrocarbon in the presence of an oxidizing agent under super-atmospheric pressure at a temperature within the range of 50 to 200° C. in a reaction mixture containing at least 6 mols of liquid hydrogen fluoride per mol of hydrocarbon, and recovering carbon as a product of the reaction.

8. A process for oxidizing non-aromatic hydrocarbons which comprises oxidizing the hydrocarbon in the presence of an oxidizing agent under super-atmospheric pressure at a temperature within the range of 50 to 200° C. in a reaction mixture containing liquid hydrogen fluoride in substantial amounts as an essential constituent, the reaction mixture further containing an oxygen carrier selected from the group consisting of silver and a compound of silver, copper, arsenic, chromium, selenium, molybdenum, tungsten, uranium, manganese and iron, and recovering carbon as a product of the reaction.

9. A process according to claim 8 in which the oxygen carrier is a compound of copper.

10. A process according to claim 8 in which the oxygen carrier is a compound of silver.

11. A process according to claim 8 in which the oxygen carrier is a compound of iron.

12. A process according to claim 2 in which the temperature is within the range of 120 to 160° C.

13. A process according to claim 2 in which the non-aromatic hydrocarbon is alicyclic.

14. A process according to claim 2 in which the non-aromatic hydrocarbon is a paraffin.

15. A process according to claim 2 in which the non-aromatic hydrocarbon is an olefin.

JOSEPH H. SIMONS.

REFERENCES CITED

The following references are of record in the file of this patent:

UNITED STATES PATENTS

| Number | Name | Date |
|---|---|---|
| 2,199,585 | Bone et al. | May 7, 1940 |
| 2,223,383 | Moyer et al. | Dec. 3, 1940 |
| 2,328,920 | Moyer | Sept. 7, 1943 |

FOREIGN PATENTS

| Number | Country | Date |
|---|---|---|
| 764,539 | France | Mar. 5, 1934 |

OTHER REFERENCES

Simons et al., J. Amer. Chem. Soc., 60, 2956-7 (1938).